United States Patent
Broers et al.

(10) Patent No.: US 7,963,389 B2
(45) Date of Patent: Jun. 21, 2011

(54) CONVEYOR

(75) Inventors: Johannes Wilhelmus Broers, Oosterblokker (NL); Jozef Walter Maria Hopman, Weesp (NL); Wouter Balk, Baambrugge (NL)

(73) Assignee: Specialty Conveyor B.V., Zwaag (NL)

( * ) Notice: Subject to any disclaimer, the term of this patent is extended or adjusted under 35 U.S.C. 154(b) by 0 days.

(21) Appl. No.: 12/442,634

(22) PCT Filed: Sep. 24, 2007

(86) PCT No.: PCT/EP2007/060091

§ 371 (c)(1),
(2), (4) Date: Jun. 22, 2009

(87) PCT Pub. No.: WO2008/037686

PCT Pub. Date: Apr. 3, 2008

(65) Prior Publication Data

US 2010/0089724 A1     Apr. 15, 2010

(30) Foreign Application Priority Data

Sep. 25, 2006   (EP) .................................... 06121202

(51) Int. Cl.
   *B65G 21/18*         (2006.01)
(52) U.S. Cl. ........................................ 198/838; 198/778
(58) Field of Classification Search .................. 198/838, 198/778

See application file for complete search history.

(56) References Cited

U.S. PATENT DOCUMENTS

| 1,149,647 A | * | 8/1915 | Harwood | 198/303 |
| 3,857,476 A | | 12/1974 | Heifetz et al. | |
| 5,038,925 A | * | 8/1991 | Chrysler | 198/831 |
| 5,105,934 A | * | 4/1992 | Cawley | 198/778 |

(Continued)

FOREIGN PATENT DOCUMENTS

DE    1004101    10/1955

(Continued)

OTHER PUBLICATIONS

Official Search Report of the European Patent Office Patent Office in counterpart foreign application No. PCT/EP2007/060091 filed Sep. 24, 2007.

(Continued)

*Primary Examiner* — Mark A Deuble
(74) *Attorney, Agent, or Firm* — Steven M. Koehler; Westman, Champlin & Kelly, P.A.

(57) ABSTRACT

A conveyor for conveying piece goods or the like through a helical path around a central axis in a vertical direction includes a frame which supports an endless conveyor belt that is movable along the helical path in a conveying direction. The conveyor belt includes carrier plates which are movably connected to each other. The frame includes at least a guide and at least a number of carrier plates comprise at least a guide roller rotatable about an axis of rotation. The guide roller has at least a first guide roller surface which is in contact with the guide in a first contact location, and a second guide roller surface which is in contact with the guide in a second contact location. The first and second contact locations are spaced from each other and the normal to the first guide roller surface in the first contact location deviates from the normal to the second guide roller surface in the second contact location. The invention provides a conveyor with a high driving efficiency as a consequence of low resistance between the carrier plate and the guide.

17 Claims, 4 Drawing Sheets

U.S. PATENT DOCUMENTS

| | | | |
|---|---|---|---|
| 5,429,227 A | 7/1995 | Kroessmann | |
| 5,538,384 A * | 7/1996 | Haldimann | 414/286 |
| 5,553,697 A * | 9/1996 | McClement | 198/332 |
| 5,620,084 A * | 4/1997 | Mensch | 198/834 |
| 5,682,975 A * | 11/1997 | Wells | 198/831 |
| 5,857,559 A * | 1/1999 | Gianvito et al. | 198/831 |
| 6,336,551 B1 | 1/2002 | Balk | |
| 6,394,260 B1 * | 5/2002 | Barth et al. | 198/799 |
| 6,588,583 B2 * | 7/2003 | Trieb | 198/845 |
| 7,556,142 B2 * | 7/2009 | Stebnicki et al. | 198/778 |
| 2006/0090987 A1 * | 5/2006 | Oppermann | 198/838 |

FOREIGN PATENT DOCUMENTS

| | | |
|---|---|---|
| DE | 957374 | 1/1957 |
| DE | 1014925 | 8/1957 |
| DE | 969122 | 4/1958 |
| DE | 20 2004 0179 | 2/2006 |
| EP | 1009692 B1 | 11/2003 |
| FR | 1050098 | 1/1954 |
| GB | 2148827 | 6/1985 |
| WO | WO 99/11547 | 3/1999 |
| WO | WO 03/024846 | 3/2003 |
| WO | WO 2007064659 | 6/2007 |

OTHER PUBLICATIONS

Written opinion of the European Patent Office Patent Office in counterpart foreign application No. PCT/EP2007/060091 filed Sep. 24, 2007.

* cited by examiner

CONVEYOR

CROSS-REFERENCE TO RELATED APPLICATION

The present application is a national stage filing of International patent application Serial No. PCT/EP2007/060091, filed Sep. 24, 2007, and published as WO 2008/037686 in English.

BACKGROUND

The present invention relates to a conveyor for conveying piece goods or the like through a helical path around a central axis in a vertical direction.

Such a conveyor is known from EP 1 009 692 B1. This prior art document discloses a conveyor provided with carrier plates comprising guide rollers which are guided by a guide having a vertical guide surface. The known arrangement of the guide and the guide roller has resulted in a reduction of frictional forces during movement of a carrier plate along the helical path.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

A conveyor for conveying piece goods or the like through a helical path around a central axis in a vertical direction includes a frame which supports an endless conveyor belt which is movable along the helical path and driven by driver in a conveying direction. The conveyor belt includes carrier plates which are movably connected to each other, each having an upper transport face. The frame includes at least a guide for guiding the carrier plates along the helical path, wherein at least a number of carrier plates comprise at least a guide roller rotatable about an axis of rotation having a component extending in a direction perpendicular to the transport face. The guide roller has at least a first guide roller surface which is in contact with a first guide surface of the guide in a first contact location, and a second guide roller surface which is in contact with a second guide surface on the guide in a second contact location. The first and second contact locations are spaced from each other, wherein the normal to the first guide roller surface in the first contact location deviates from the normal to the second guide roller surface in the second contact location such that the guide roller is supported by the guide upwardly and radially.

Due to these features the guide roller of the carrier plate is supported by the guide in two different directions; in practice being a direction parallel to the axis of rotation as well as perpendicular thereto. As the guide roller is supported in both directions the displacement of the guide roller with respect to the guide can be effected by rolling of the guide roller along the guide with low friction or without slip. This results in a lower friction between the carrier plate and the guide during movement of the carrier plate along the guide, resulting in a high driving efficiency.

The axis of rotation may extend substantially perpendicular to the transport face. The advantage of this orientation is that the guide roller may be positioned close to the trans-port face resulting in a compact construction height of a carrier plate.

The normal to the first guide roller surface in the first contact location may be substantially perpendicular to the axis of rotation. This has the benefit of low friction between the first guide roller surface and the first guide surface within the first contact location since this feature results in a rolling movement only of the first guide roller surface on the first guide surface.

In one embodiment, the first contact location is positioned at the same location as or close to the second contact location in radial direction of the axis of rotation, because in that configuration the difference in rotational speed of the guide roller at the first and second contact locations is small or even zero. Hence, the slip of the guide roller with respect to the guide in the second contact location is minimized, resulting in further improved efficiency.

The second guide and guide roller surfaces can be adapted such that the second contact location substantially forms a point contact. This has the advantage that the slip within the second contact location due to a varying distance to the axis of rotation is minimized.

The first guide roller surface may be formed by a cylindrically shaped guide roller portion, whereas the first guide surface may extend parallel to the axis of rotation in a plane perpendicular to the conveying direction, hence forming a line contact between the guide roller and the guide in the first contact location. A line contact has the advantage of a stable support of the guide to the guide roller in the direction of the axis of rotation and provides a low rolling resistance.

The second guide surface may be adjacent to the first guide surface and extend obliquely downwards when viewed from the central axis to the axis of rotation. The advantage of this configuration is that a cylindrical guide roller can be applied without the risk of grating a side wall of the roller along the guide.

The guide roller may have a cylindrical shape and the guide may have a trough-shaped cross section as seen in the conveying direction, wherein the guide is oriented such that the opening of the trough-shaped cross section receives the guide roller in radial direction of the axis of rotation. A lower wall of the opening of the trough comprises the second guide surface, the bottom of the trough comprises the first guide surface and an upper wall of the trough opposite to the lower wall comprises a third guide surface for guiding the guide roller along the guide if the carrier plate is lifted upwardly when the conveyor is in operation. The advantage of this configuration is that it is relatively simple to manufacture and provides a guide for guiding a guide roller both in upward and downward direction of the carrier plate.

Alternatively, the second guide roller surface can be formed by at least a flange disposed coaxially with the guide roller which flange is adapted such that the second guide roller surface is adjacent to the first guide roller surface and extending obliquely upwardly when viewed in radial direction from the axis of rotation. Such a guide roller with flange can be manufactured relatively easily.

The guide roller can have a diabolo shape having a circumferential groove defined by an upper wall which comprises the second guide roller surface, a bottom wall extending coaxially with the axis of rotation which bottom wall comprises the first guide roller surface, and a lower wall opposite to the upper wall which comprises a third guide roller surface for guiding the guide roller along the guide if the carrier plate is lifted upwardly when the conveyor is in operation. The advantage of a diabolo-shaped guide roller is that the guide not only supports the guide roller in upward direction and radial direction thereof, but also downwardly when the carrier plate is lifted upwardly.

The carrier plate may be provided with at least a second guide roller spaced from the guide roller in a radial direction of the central axis, which second guide roller is adapted to be supported by and to roll along a second guide on the frame. It is advantageous when the carrier plate is supported at more than one supporting location by guide rollers so as to eliminate any sliding contacts between the carrier plate and the guides.

The second guide roller can have identical dimensions as the guide roller, since this minimizes manufacturing costs.

The carrier plate may be mirror symmetrical, wherein a plane perpendicular to the upper transport face and parallel to the conveying direction forms the line of symmetry. A symmetrical configuration facilitates the manufacturing process.

Alternatively, the carrier plate may include a single guide roller and be provided with a supported portion spaced from the axis of rotation of the guide roller, wherein the conveyor includes at least a second carrier plate adjacent to the carrier plate as seen in radial direction of the central axis, wherein the second carrier plate comprises at least a second carrier plate guide roller which is supported by a second carrier plate guide, and a supporting portion located in the proximity of an axis of rotation of the second carrier plate guide roller which supporting portion is in engagement with the supported portion of the carrier plate so as to support the supported portion of the carrier plate through the second carrier plate guide roller. This embodiment has the advantage that carrier plates which have a relatively short longitudinal length allowing only a single guide roller may benefit from the support of the second carrier plate guide roller of the adjacent second carrier plate. When the carrier plate and the second carrier plate have the same speed at the supported and supporting portion in the conveying direction the carrier plate is supported by the guide roller and the second carrier plate guide roller without friction resistance between the carrier plate and the second carrier plate.

BRIEF DESCRIPTION OF THE DRAWINGS

Aspects of the invention will hereafter be further explained with reference to the drawings showing embodiments of the conveyor by way of example.

DETAILED DESCRIPTION OF THE ILLUSTRATIVE EMBODIMENTS

Figure 1:
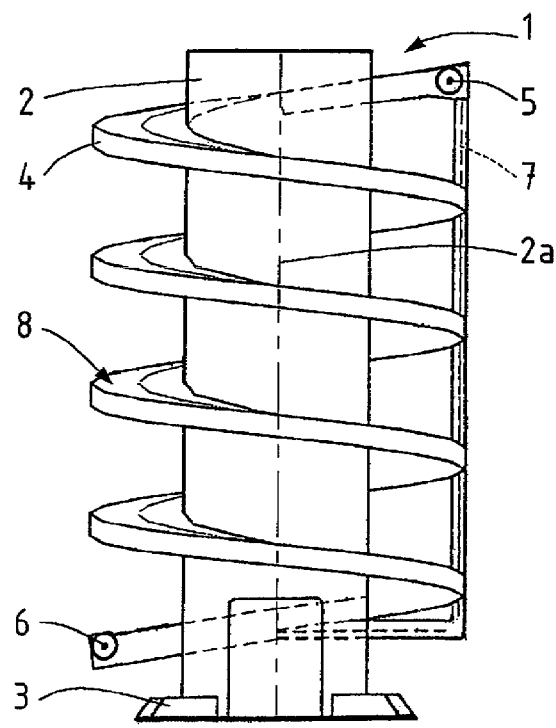
FIG. 1 is a very schematic and general side view of an embodiment of a conveyor.
Figure 2:
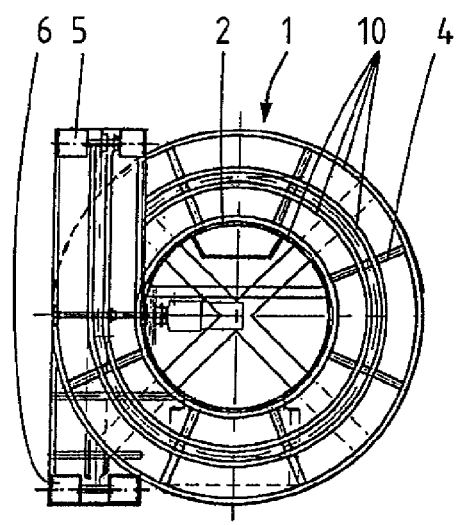
FIG. 2 is a plan view of the frame of the conveyor of FIG. 1.

FIG. 1 shows a conveyor adapted to convey piece goods or the like, through a helical path in the vertical direction. In practice such conveyors are known as spiral conveyors or winding conveyors. These conveyors are able to transport articles in a continuous flow in a conveying direction. This product flow may be intended for vertical transport or for buffering in a process section. Areas of utilization are for example the food processing industry, distribution centers, the graphics industry and the like.

The conveyor as shown comprises a frame 1, in this case including a central column 2 having a central axis 2a, feet 3 and a helical guide chute 4 extending around the column 2 and fixed thereto. Of course various kinds of other frame structures are also conceivable. An end pulley 5, 6 is provided at the upper and lower ends of the guide chute 4, and between these ends of the helical guide chute 4 extends a return chute 7 of the frame 1. In this case an endless conveyor belt 8, which is supported by the frame 1, is guided through another path in the conveying part and the return part. However, embodiments are conceivable in which the conveying part is guided back at the lower side of the guide chute 4. The conveyor belt is driven by a drive (not shown) in the conveying direction.

In the case as shown, the helical guide chute 4 includes four windings, but this number may be increased or decreased depending on the particular case. Due to the invention it is possible to drive the endless conveyor belt 8 through a great number of windings without any drive problems and at high efficiency. In the embodiment shown a drive motor may engage the end pulley at the end of the path of the conveyor, that is the end pulley 5 or 6, and if desired it is possible to use also auxiliary drives at other positions in the transport path. A linear drive for the endless conveyor belt 8 is also conceivable. The conveyor may join to other conveyors at the upper and lower end pulleys 5, 6.

Figure 3:
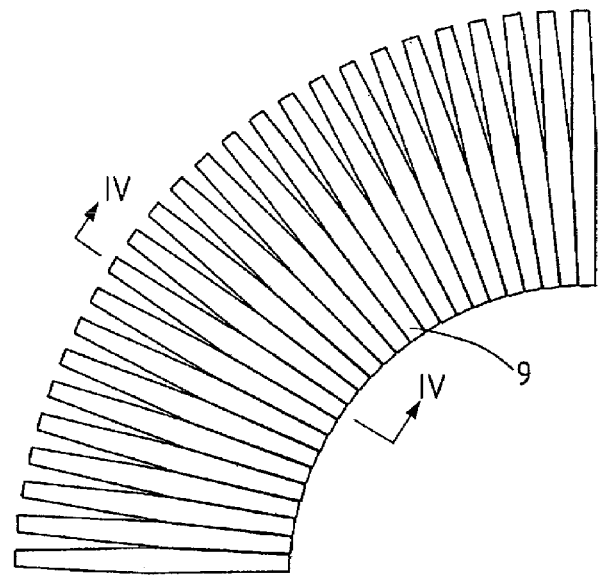
FIG. 3 is a larger-scale plan view of the carrier plates of a small portion of the conveyor belt of the conveyor of FIGS. 1 and 2 in the helical path.
Figure 4:
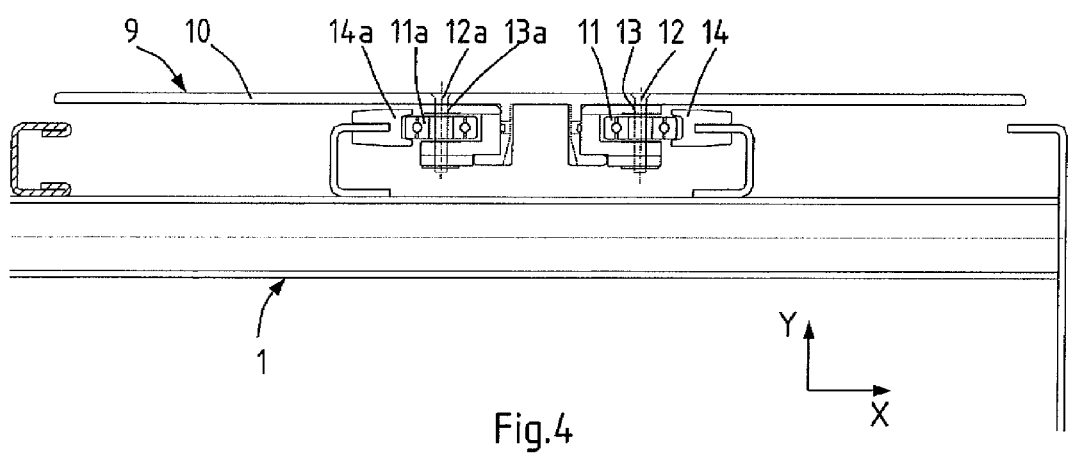
FIG. 4 is a larger-scale sectional view along the line IV-IV in FIG. 3 perpendicular to the upper transport face of the carrier plate.

FIG. 3 shows a plan view of the carrier plates of a small portion of the conveyor belt of the conveyor. FIG. 4 shows a sectional view in a plane perpendicular to the conveying direction (along the line IV-IV in FIG. 3). With reference to these figures, the endless conveyor belt 8 comprises a plurality of carrier plates 9 movably coupled to each other, either directly or through an endless connecting member, such as a side bow chain. In the embodiment each carrier plate 9 has an upper flat transport face 10. The carrier plates 9 are joined to each other so closely in the transport path that articles may be supported by a number of adjacent carrier plates 9. The carrier plates 9 are elongated elements having a longitudinal direction extending substantially radially with respect to the central axis 2a.

FIG. 4 shows an embodiment of a carrier plate 9 which is provided with two guide rollers: a guide roller 11 and a second guide roller 11a, which are spaced from each other in radial direction of the central axis 2a (X direction). Both guide rollers 11, 11a are rotatable around an axis of rotation 12, 12a extending in the Y direction. The Y direction is herein defined as extending perpendicular to the upper transport face, which is close to vertical in practice, depending on the inclination angle of the helical path. The orientation of the axes of rotation 12, 12a of the guide rollers 11, 11a is not restricted to the Y direction. Axes of rotation 12, 12a extending obliquely with respect to the Y direction are also conceivable. For example, it is possible that both guide rollers 11, 11a comprise axes of rotation 12, 12a having opposite angles to each other in the plane perpendicular to the conveying direction, for example, a V-shaped axes orientation when viewed in the conveying direction.

The guide rollers 11, 11a are journalled on corresponding rotary shafts 13, 13a, preferably by means of a rolling bearing to obtain smooth running of the guide rollers 11, 11a.

In the embodiment shown in FIG. 4 the guide rollers 12 co-operate with a guide 14 and a second guide 14a, respectively, which are fixed to the frame 1. In this case the central column 2 of the conveyor 1 is located at the right side (X direction) of the carrier plate 9 in FIG. 4. This means that the main radial forces under normal operation of the conveyor are exerted on the guide roller 11 and the guide 14 in FIG. 4, as guide 14 is able to support the guide roller 11 in a radial direction facing from the central axis 2a. In FIG. 4 the carrier plate 9 including the guide rollers 11, 11a are mirror symmetrical in a plane perpendicular to the upper transport face 10 and parallel to the conveying direction. In the embodiment as shown, this plane intersects the center of the carrier plate 9 in axial direction thereof. It is also possible that the second guide roller 11a is designed and mounted to the carrier plate differently with respect to the guide roller 11. The guides 14 and 14a as shown in FIG. 4 comprise a groove shape along the helical path, which grooves face each other and guide the guide rollers 11, 11a. As the second guide roller 11a has a larger distance from the central axis 2a than the guide roller 11, the second guide 14a has a larger diameter than the guide 14 when viewed along the central axis 2a.

Figure 5:
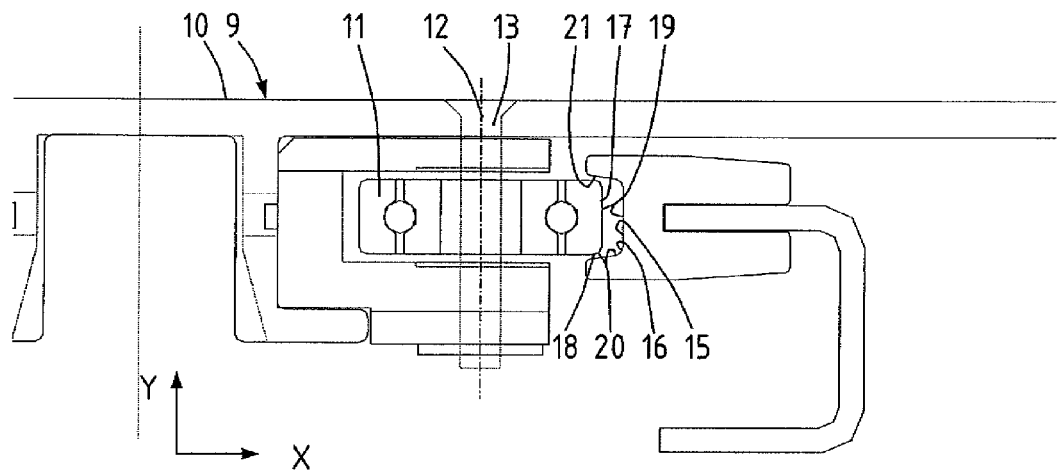
FIG. 5 is an enlarged view of a part of FIG. 4.

FIG. 5 shows an enlarged view of a part of the embodiment as shown in FIG. 4. The guide 14 comprises a first guide surface 15 and a second guide surface 16. The guide roller 11 comprises a first guide roller surface 17 and a second guide roller surface 18. When the conveyor is in operation the first guide roller surface 17 and the first guide surface 15 are in contact with each other in a first contact location 19, and the second guide roller surface 18 and the second guide surface 16 are in contact with each other in a second contact location 20.

The first contact location 19 forms a line contact since the guide roller 11 is cylindrical and the first guide surface 15 extends parallel to the axis of rotation 12 in a plane perpendicular to the conveying direction in this embodiment. It is noted that a line contact is a mathematical term and in practice a line contact will only be approached.

According to the invention the normal to the first guide roller surface 17 in the first contact location 19 and the normal to the second guide roller surface 18 in the second contact location deviate from each other, which can be seen in FIG. 5. Due to this feature the guide roller 11 can be supported upwardly (Y direction) and radially (X direction) by the guide 14. The second contact location 20 is preferably a point contact, which is located very close to the first contact location 19 so as to minimize slip between the guide roller 11 and the guide 14 due to differences in rotational speed of the guide roller 11 in the first and second contact locations 19, 20. This means that the second guide surface 16 preferably is adjacent to the first guide surface 15 and extends downward as seen from the first guide surface 15 in the direction of the axis of rotation 12 in the case of a cylindrical guide roller 11 in order to create a point contact in the second contact location 20 in the case of a cylindrical roller 11. It is noted that a point contact is a mathematical term and in practice a point contact will only be approached.

In the embodiment of FIG. 5 the guide 14 has a trough-shaped cross section. The opening of the trough is directed in radial direction to the axis of rotation 12 and extends along the helical path. The trough-shaped guide 14 comprises the second guide surface 16 as a lower wall of the opening, the first guide surface 15 as a bottom of the trough and a third guide surface 21 as an upper wall of the trough. The third guide surface 21 is opposite to the second guide surface 16 and serves to guide the guide roller 11 along the guide 14 if the carrier plate 9 is lifted upwardly (Y direction) with respect to the frame.

Figure 6:
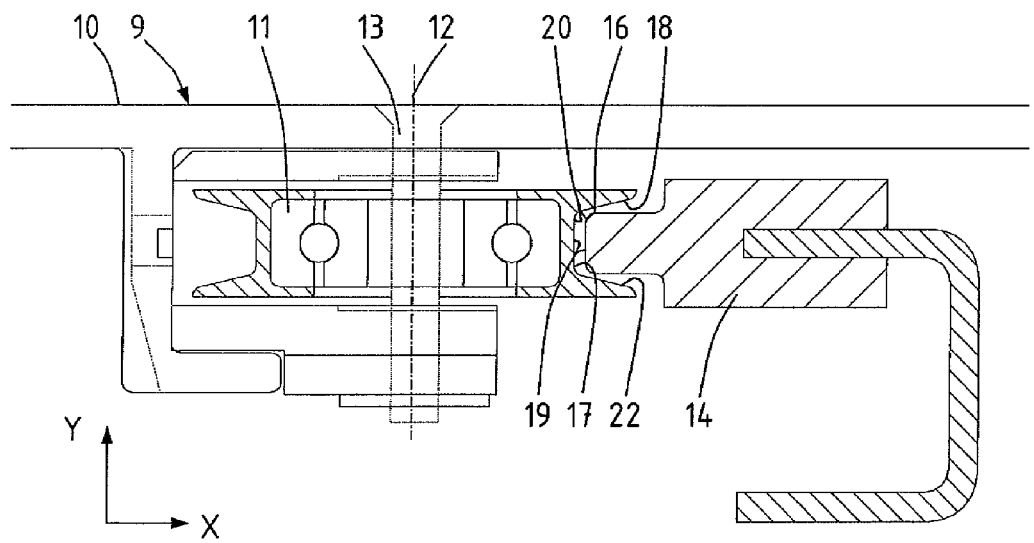
FIG. 6 is a view corresponding to that of FIG. 5 showing an alternative embodiment of the guide roller and the guide.

In the alternative embodiment of the guide roller 11 and the guide 14 such as shown in FIG. 6 the guide roller 11 has a diabolo shape. This guide roller 11 may be made of a cylindrical roller which is covered circumferentially by a diabolo-shaped cover element which is made of plastic such as nylon, for example. In this embodiment a portion of the guide 14 fitting into the circumferential groove of the diabolo-shaped guide roller 11 has a rectangular cross sectional shape. Preferably the corners of the this portion of the guide facing the groove have a rounded shape so as to avoid a too high local contact pressure, such as shown in FIG. 6.

The guide 14 comprises the first guide surface 15 and the second guide surface 16. In this embodiment the second guide surface 16 is facing upwardly so as to support the diabolo-shaped guide roller 11 upwardly in the second guide roller surface 18. When the conveyor is in operation the first guide roller surface 17 and the first guide surface 15 are in contact with each other in the first contact location 19. The first contact location 19 forms a line contact since the first guide roller surface 17 forms a cylindrical portion and the first guide surface 15 extends parallel to the axis of rotation 12 in a plane perpendicular to the conveying direction. The second guide roller surface 18 and the second guide surface 16 are in contact with each other in a second contact location 20.

The second guide roller surface 18 is adjacent to the first guide roller surface 17 and extends obliquely upwardly when viewed from the axis of rotation 12. The opening of the circumferential groove of the diabolo is defined by the second guide roller surface 18 as an upper wall, the first guide roller surface 17 as a bottom wall extending parallel to the axis of rotation 12, and a third guide roller surface 22 as a lower wall opposite to the upper wall. The third guide roller surface 22 serves for guiding the guide roller along the guide if the carrier plate is lifted upwardly when the conveyor is in operation.

Figure 7:
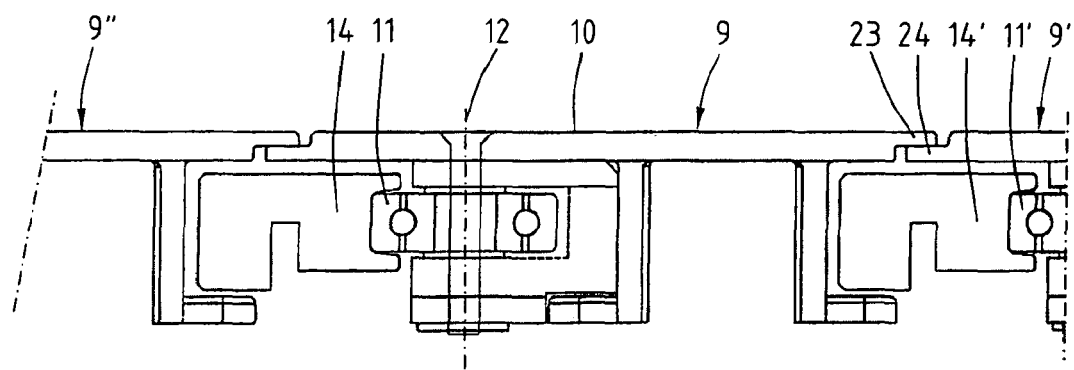
FIG. 7 is a view similar to that of FIG. 4, but showing an alternative embodiment of the carrier plate.

FIG. 7 shows an alternative embodiment of a carrier plate 9. The length in longitudinal direction of the carrier plate 9 is relatively small, such that in practice the carrier plate is provided with a single guide roller 11. In this case the conveyor comprises more than one carrier plate 9 located adjacent to each other as seen in a radial direction of the central axis 2a thereof. FIG. 7 (partially) shows three carrier plates 9, 9' and 9" of which the longitudinal directions extend substantially perpendicularly to the conveying direction and substantially parallel to the plane of the upper transport face 10. A second carrier plate 9' is provided with a second carrier plate guide roller 11' which is guided by a second carrier plate guide 14'. The carrier plate 9 is supported by the guide 14 and has an effective supported portion at the axis of rotation 12. In this embodiment the carrier plate includes a second supported portion, in this case the end portion 23. The end portion 23 of the carrier panel 9 is located at a distance from the axis of rotation 12. The second carrier plate 9' includes a supporting portion, in this case an end portion 24 of the second carrier plate 9' located in proximity of the axis of rotation of the second carrier plate guide roller 11'.

The end portion 24 of the second carrier plate 9' is in engagement with the end portion 23 of the carrier plate 9. As a consequence, the carrier plate 9 is supported by both the guide roller 11 and the second carrier plate guide roller 11' of the adjacent carrier plate 9'. The end portions 23, 24 are shaped such that the upper transport face 10 is substantially flat. When the speed of both carrier plates 9 and 9' at the respective end portions 23, 24 in the conveying direction is similar there is no friction between the adjacent carrier plates 9 and 9'. From the foregoing it will be clear that the invention provides a conveyor which is able to achieve a low resistance between the carrier plates and the guide during operation. Due to deviating normals to the first and second guide roller surfaces in the first and second contact locations, respectively, the conveyor provides a high driving efficiency.

The invention is not restricted to the above-described embodiments, which can be varied in a number of ways within the scope of the claims. For instance, the carrier plate may comprise a first guide roller having a substantially vertical axis of rotation and another guide roller having a horizontal axis of rotation perpendicular to the conveying direction so as to support the carrier plate upwardly only. The carrier plate and the guide may then comprise a well-known element preventing the carrier plate from moving upwardly. A carrier plate comprising one guide roller whereas a second part of the carrier plate is slidably supported is also conceivable. Regarding the alternative embodiment with the diabolo-shaped guide roller the second guide surface of the guide roller may be formed, for example, by only one flange which is disposed coaxially with the cylindrical guide roller instead of a diabolo-shape including two coaxial flanges. The third contact surface may then be formed by a slidable contact in the case when the carrier plate is lifted upwardly.

The invention claimed is:

1. A conveyor for conveying piece goods or the like in a vertical direction through a curved transport path, comprising a frame which supports an endless conveyor belt which is movable along the curved transport path in a conveying direction, said conveyor belt including a set of carrier plates which are movably connected to each other, each carrier plate having an upper transport face, said frame including at least one guide assembly for guiding the carrier plates along the curved transport path, wherein each guide assembly includes a guide and at least a number of carrier plates comprise a guide roller rotatable about an axis of rotation that intersects with the transport face, each of said guide rollers having at least a first guide roller surface which is in contact with a first guide surface of the guide in a first contact location, and a second guide roller surface which is in contact with a second guide surface on the guide in a second contact location, which first and second contact locations are spaced from each other, and wherein the normal to the first guide roller surface in the first contact location deviates from the normal to the second guide roller surface in the second contact location such that each guide roller is supported by the guide upwardly and radially and wherein at least for a portion of said curved transport path only said guide rollers are used to support and guide the carrier plates on the frame.

2. The conveyor according to claim 1, wherein the axis of rotation extends substantially perpendicular to the transport face.

3. The conveyor according to claim 1, wherein the first guide roller is arranged such that a normal to the first guide roller surface in the first contact location is substantially perpendicular to the axis of rotation.

4. The conveyor according to claim 1, wherein the first contact location is positioned at the same location as or close to the second contact location in a radial direction of the axis of rotation.

5. The conveyor according to claim 1, wherein at least the second guide and guide roller surfaces are adapted such that the second contact location substantially forms a point contact.

6. The conveyor according to claim 1, wherein the first guide roller surface is formed by a cylindrically shaped guide roller portion, whereas the first guide surface extends parallel to the axis of rotation in a plane perpendicular to the conveying direction, hence forming a line contact between the guide roller and the guide.

7. The conveyor according to claim 6, wherein the curved transport path is defined with respect to a central axis, and wherein the second guide surface is adjacent to the first guide surface extending obliquely downwards when viewed from the central axis to the axis of rotation.

8. The conveyor according to claim 1, wherein the guide roller has a cylindrical shape and the guide has a trough-shaped cross section as seen in the conveying direction, wherein the guide is oriented such that an opening of the trough-shaped cross section receives the guide roller in radial direction of the axis of rotation, wherein a lower wall of the opening of the trough comprises said second guide surface, a bottom of the trough comprises the first guide surface and an upper wall of the trough opposite to the lower wall comprises a third guide surface for guiding the guide roller along the guide if the carrier plate is lifted upwardly in a direction parallel to the axis of rotation when the conveyor is in operation.

9. The conveyor according to claim 1, wherein the second guide roller surface is formed by at least a flange disposed coaxially with the guide roller which flange is adapted such that the second guide roller surface is adjacent to the first guide roller surface and extends obliquely upwardly when viewed in a radial direction from the axis of rotation.

10. The conveyor according to claim 9, wherein the guide roller has a diabolo shape having a circumferential groove defined by an upper wall which comprises the second guide roller surface, a cylindrical bottom wall extending coaxially with the axis of rotation which bottom wall comprises the first guide roller surface, and a lower wall opposite to the upper wall which comprises a third guide roller surface for guiding the guide roller along the guide if the carrier plate is lifted upwardly in a direction parallel to the axis of rotation when the conveyor is in operation.

11. The conveyor according to claim 1, wherein the guide assembly includes a second guide and at least a number of carrier plates comprise at least a second guide roller arranged to engage the second guide, wherein each second guide roller is spaced from each corresponding first-mentioned guide roller on the corresponding carrier plate in a radial direction from a curve in the curved transport path.

12. The conveyor according to claim 11, wherein the second guide roller has identical dimensions as the guide roller.

13. The conveyor according to claim 11, wherein each of at least some carrier plates is mirror symmetrical relative to a line of symmetry, and wherein a plane perpendicular to the upper transport face and parallel to the conveying direction of each of said at least some carrier plates forms the line of symmetry.

14. The conveyor according to claim 1, wherein each of at least some carrier plates includes a single guide roller, and wherein each of said at least some carrier plates is provided with a supported portion spaced from the axis of rotation of the guide roller, wherein the conveyor includes a set of second carrier plates where a second carrier plate is adjacent to a carrier plate of said first-mentioned set of carrier plates as seen in radial direction from a curve in the curved transport path, wherein said frame include a second guide assembly for guiding each of the second carrier plates along the curved transport path, wherein the second guide assembly includes a second guide and at least a number of the second carrier plates comprise a second guide roller engaging the second guide, and wherein each of the second carrier plates include a supporting portion located in the proximity of an axis of rotation of the second carrier plate guide roller which said supporting portion of the second carrier plate is in engagement with the supported portion of the carrier plate of the first-mentioned set of carrier plates so as to support the supported portion of carrier plate of the first-mentioned set of carrier plates through the second carrier plate guide roller.

15. The conveyor according to claim 1, wherein the curved transport path is a helical path around a central axis in the vertical direction.

16. A conveyor for conveying piece goods or the like in a vertical direction through a curved transport path, comprising a frame which supports an endless conveyor belt which is movable along the curved transport path in a conveying direction wherein the conveyor belt has an inner curved portion and an outer curved portion with respect to the curved transport path, said conveyor belt including a set of carrier plates which are movably connected to each other, each carrier plate having an upper transport face, said frame including at least one guide assembly for guiding the carrier plates along the curved transport path, wherein each guide assembly includes a guide and at least a number of carrier plates comprise a guide roller rotatable about an axis of rotation that intersects with the transport face, each of said guide rollers having at least a first guide roller surface which is in contact with a first guide surface of the guide in a first contact location, and a second guide roller surface which is in contact with a second guide surface on the guide in a second contact location, which first and second contact locations are spaced from each other, and wherein the normal to the first guide roller surface in the first contact location deviates from the normal to the second guide roller surface in the second contact location such that each guide roller is supported by the guide upwardly and radially, and wherein at least for a portion of said curved transport path said carrier plates are free from guided movement apart from said at least one guide assembly as seen from the inner curved portion to the outer curved portion of the conveyor belt.

17. A conveyor for conveying piece goods or the like in a vertical direction through a curved transport path, comprising a frame which supports an endless conveyor belt which is movable along the curved transport path in a conveying direction, wherein the conveyor belt has an inner curved portion and an outer curved portion with respect to the curved transport path, said conveyor belt including carrier plates which are movably connected to each other, each carrier plate having an upper transport face, said frame including at least one guide assembly for guiding the carrier plates along the transport path, wherein each guide assembly includes a guide and at least a number of carrier plates comprise at least a guide roller rotatable about an axis of rotation having a component extending in a direction perpendicular to the transport face, each of said guide rollers having a guide roller surface which is in contact with a guide surface of the guide in a contact location such that the guide roller is radially and upwardly supported by the guide at said contact location, and wherein at least for a portion of said curved transport path said carrier plates are free from guided movement apart from said at least one guide assembly as seen from the inner curved portion to the outer curved portion of the conveyor belt.

* * * * *